(12) United States Patent
Hurwitz et al.

(10) Patent No.: US 11,907,752 B1
(45) Date of Patent: Feb. 20, 2024

(54) WORK DISTRIBUTION SERVICE

(71) Applicant: City Storage Systems LLC, Los Angeles, CA (US)

(72) Inventors: Jordan Hurwitz, Redwood City, CA (US); Henning Korsholm Rohde, Seattle, WA (US); Kristopher Raney, Oak Park, CA (US); Brian Atwell, Los Angeles, CA (US)

(73) Assignee: City Storage Systems LLC, Los Angeles, CA (US)

( * ) Notice: Subject to any disclaimer, the term of this patent is extended or adjusted under 35 U.S.C. 154(b) by 0 days.

(21) Appl. No.: 18/083,340

(22) Filed: Dec. 16, 2022

(51) Int. Cl.
*G06F 15/16* (2006.01)
*G06F 9/46* (2006.01)
*G06F 16/22* (2019.01)
*G06F 16/27* (2019.01)

(52) U.S. Cl.
CPC .......... *G06F 9/465* (2013.01); *G06F 16/2228* (2019.01); *G06F 16/278* (2019.01)

(58) Field of Classification Search
CPC ..... G06F 9/465; G06F 16/278; G06F 16/2228
USPC ........................................................ 709/201
See application file for complete search history.

(56) References Cited

U.S. PATENT DOCUMENTS

| | | | | |
|---|---|---|---|---|
| 9,590,843 | B2* | 3/2017 | Cui | G06F 11/00 |
| 10,346,217 | B1* | 7/2019 | Bray | G06F 9/5033 |
| 10,467,241 | B2* | 11/2019 | Thayer | H04L 41/0806 |
| 10,530,844 | B2* | 1/2020 | Shraer | G06F 9/5066 |
| 10,545,921 | B2* | 1/2020 | Ben Dayan | G06F 11/3419 |
| 10,769,126 | B1* | 9/2020 | Hagerup | G06F 16/2453 |
| 11,366,700 | B1* | 6/2022 | Goren | G06F 9/44505 |
| 11,544,226 | B2* | 1/2023 | Ben Dayan | G06F 16/188 |
| 11,698,805 | B2* | 7/2023 | Wan | G06F 9/5083 |
| | | | | 718/1 |
| 2016/0204977 | A1* | 7/2016 | Cui | G06F 11/00 |
| | | | | 370/221 |
| 2021/0011781 | A1* | 1/2021 | Wan | G06F 9/45558 |
| 2021/0097081 | A1* | 4/2021 | Firnkes | G06F 16/27 |
| 2023/0132493 | A1* | 5/2023 | Memon | G06F 3/0604 |
| | | | | 711/154 |

\* cited by examiner

*Primary Examiner* — Moustafa M Meky
(74) *Attorney, Agent, or Firm* — Lerner David LLP

(57) ABSTRACT

This present disclosure provides for a work distribution service, which is a multi-region, reliable service for dynamically sharding key ranges. The work distribution service offers exclusive ownership with leases, load balancing and routing information for owner discovery. Using the work distribution service, services can easily scale horizontally by sharding their workloads.

20 Claims, 8 Drawing Sheets

WORK DISTRIBUTION SERVICE

BACKGROUND

Horizontal scaling refers to the addition of node or machines to a computing infrastructure when workload demands increase. For example, applications hosted on a first server may want to scale, by adding a second server, if traffic for the application exceeds capacity for the first server. Horizontal scaling is commonly implemented using sharding, in which data is partitioned across a collection of databases. However, sharding is not always easy, or even possible, for some infrastructures.

BRIEF SUMMARY

The present disclosure describes a work distribution service that enables sharding-as-a-service, thereby allowing for horizontal scaling. The work distribution service provides consolidation, flexibility, and exclusivity. In terms of consolidation, the work distribution service simplifies a number of services which will no longer need to do leader election. In terms of flexibility, the work distribution service makes advanced features, like routing information and dynamic resharding, generally available to any service. Automatically re-sharding and re-balancing to fit an auto-scaling service is a significant improvement over a static scheme. With regard to exclusivity, the work distribution service offers exclusivity of assignment, such that work assignments are exclusively assigned to a single consumer and the work distribution service does not allow duplicate assignments. In this regard, integrated services can implement leader election. In addition to such benefits, new services may be implemented at low cost.

One aspect of the disclosure provides a method of distribution of workload among a plurality of instances. The method may include receiving, with one or more processors, one or more domain registrations from one or more consumers, each of the one or more domain registrations for executing an application in one of a plurality of instances within a region, assigning, with the one or more processors, key ranges associated with a distributed database to each instance, each key range defining a shard, generating, with the one or more processors, a routing table mapping each instance with the assigned key ranges, and publishing the routing table to the plurality of instances. Each instance may be executed in one region of a multi-region computing environment. Assigning the key ranges may include distributing an entire set of available keys associated with the distributed database to the instances in each region.

According to some examples, the method may further include identifying a workload for each of the plurality of instances. Identifying the workload may include polling the plurality of instances for a number of active jobs in each instance and/or monitoring the plurality of instances for performance and/or failures.

According to some examples, the method may further include determining, by the one or more processors, whether to reshard, redistributing the key ranges of the distributed database among the plurality of instances when it is determined to reshard, and updating the routing table with an updated mapping of the plurality of instances and assigned key ranges. Determining whether to reshard may be based on determining that an instance is being added or removed in one of the one or more regions. Determining whether to reshard may be based on a workload for one or more of the plurality of instances.

Another aspect of the disclosure provides a system for distribution of workload among a plurality of instances. The system may include a memory and one or more processors configured to receive one or more domain registrations from one or more consumers, each of the one or more domain registrations for executing an application in one of a plurality of instances within a region, assign key ranges associated with a distributed database to each of the plurality of instances, each key range defining a shard, generate a routing table mapping each of the plurality of instances with the assigned key ranges, and publish the routing table to the plurality of instances.

The one or more processors may comprise one or more computing nodes including a leader and one or more coordinators. Further, one or more proxies may be configured to route communications between the plurality of instances and the one or more coordinators.

According to some examples, each of the plurality of instances may be executed in one region of a multi-region computing environment. Assigning the key ranges may include distributing an entire set of available keys associated with the distributed database to the plurality of instances in each region.

According to some examples, the one or more processors may be further configured to identify a workload for each of the plurality of instances, identifying the workload comprising polling the plurality of instances or monitoring the plurality of instances.

According to some examples, the one or more processors may be further configured to determine whether to reshard, redistribute the keys of the distributed database among the plurality of instances when it is determined to reshard, and update the routing table with an updated mapping of the plurality of instances and assigned key ranges. Determining whether to reshard may be based on determining that an instance is being added or removed in one of the one or more regions. Determining whether to reshard may be based on a workload for one or more of the plurality of instances.

Yet another aspect of the disclosure provides a non-transitory computer-readable storage medium storing instructions executable by one or more processors for performing a method of distribution of workload among a plurality of instances, comprising receiving one or more domain registrations from one or more consumers, each of the one or more domain registrations for executing an application in one of a plurality of instances within a region, assigning key ranges associated with a distributed database to each of the plurality of instances, each key range defining a shard, generating a routing table mapping each of the plurality of instances with the assigned key ranges, and publishing the routing table to the plurality of instances. Such method may further include determining whether to reshard, redistributing the key ranges of the distributed database among the plurality of instances when it is determined to reshard, and updating the routing table with an updated mapping of the plurality of instances and assigned key ranges.

DETAILED DESCRIPTION

Figure 1:
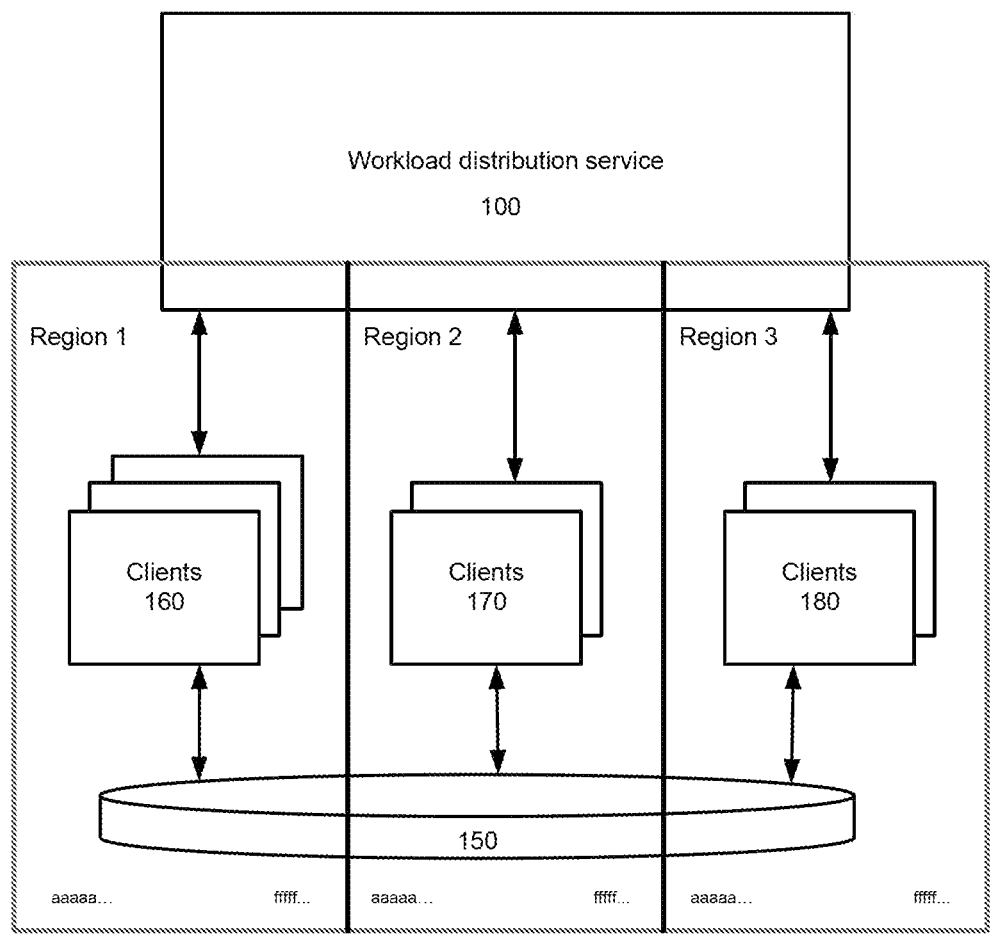
FIG. 1 a block diagram illustrating an example architecture of a work distribution service node according to aspects of the disclosure.

The present disclosure provides a work distribution service. The work distribution service is a multi-region service using a distributed database and key-value store for shard domain definitions and leader election. The work distribution service allows for sharding-as-a-service, which enables horizontal scaling even when an infrastructure does not provide for sharding. The work distribution service may include a streaming remote procedure call (RPC) application programming interface (API) for shard ownership, with exclusive ownership of shards with leases, load balancing of shards, and routing information for owner shard discovery. The load balancing of shards may include load balancing between customers. It may include a leader election API. It may provide for dynamic modification of work distribution, including moving work away from a failing region and redirecting work from a failed deployment.

For multi-tenancy, the work distribution service uses a tenant and domain as namespaces. A tenant may be a service or set of services for an organization. By way of example, a tenant for an online ordering and delivery platform may be a cloud printing service that manages receipt of an order from a remote client computing device and printing of the order at a second computing device within the organization. The tenant may consist of one or more domains, wherein the domains function as independent sharding spaces. In some examples, the tenant may be a regional location that houses servers providing cloud services.

The domain may be a logical organization of connected physical network resources and users. The domain may include servers, printers, and other devices. It may also provide a mechanism for authorizing and authenticating users for network access, and administrators can control which resources a user can access. A consumer registers for a specific domain, and receives shard assignments for that domain. The domain also enables users on the network to communicate.

Each domain may span multiple regions, each region being a specific geographical location where resources (e.g., servers, printers, other computing devices, etc.) operate. Each region spans a universally unique identifier (UUID) range. The unit of assignment is a shard, which is a tuple identifying a half-open UUID range for a domain and region:

(tenant, domain, region, from, to)

UUIDs key ranges provide a number of advantages over a discrete shard space, such as integers. Examples of such advantages include support for splitting key ranges arbitrarily deep during resharding, support for auto-scaling shard count, and natural avoidance of hotspots.

For a given domain, the work distribution service provides that all shards for all regions are assigned to some consumer of that domain. It also provides each connected recipient with the full list of assignments and recipient metadata, so that they can potentially communicate directly. The owning range of any particular key (tenant, domain, region, UUID) can easily be found.

The work distribution service may attempt to find a balanced allocation that respects region-affinity, so that if a use case is tied to the distributed database and key-value store, then input/output (I/O) operations will be region-local if a recipient is present in that region. This behavior can be configured for special domains, such as leader election.

Applications utilizing the work distribution service may include, for example, a cloud printing service wherein a server monitors a set of printers. The monitoring server may periodically scan the key range in the distributed database and key-value store for updates. In some examples, a minimal number of shards per region may be specified to ensure scans of the distributed database are workable.

The work distribution service may provide client-side leader election functionality using a domain with a single leader shard. Moreover, the work distribution service may provide a number of application programming interfaces (APIs) for interacting with work balancing. For example, the work distribution service may be used to direct work away from certain regions, or suspend domains completely. As such, during outages work may be quickly directed away from failing regions or deploys.

FIG. 1 illustrates an example of the work distribution service in operation across multiple regions. In this example, work distribution service 100 is deployed in Region 1, Region 2, and Region 3. Each of the regions includes one or more clients 160, 170, 180. Each client may include, for example, an instance, such as a server running an application. The application may be run in a container, virtual machine, or the like. While for simplicity of illustration a client may include a single application running in one or multiple containers. According to some examples, each container may be grouped. For example, such groups may be one or more pods, such as in Kubernetes, having shared computing resources with the region. Each region may have a same or different number of clients, containers, or pods. For example, as shown, Region 1 includes three clients 160, while Region 2 and Region 3 each include two clients 170, 180. It should be understood that these are merely examples, and that the number of clients in each region may vary. Similarly, while three regions are illustrated in FIG. 1, it should be understood that the work distribution service may be deployed across additional or fewer regions.

The clients 160, 170, 180 in each region may receive region local shard assignments. Shards may be defined by key ranges, and the assignments may cover the full span of keys available in the distributed database and key value store 150. For example, as shown, the full span of keys is denoted as aaaaa . . . through fffff . . . , though these are merely example illustrations for key range identifiers which may otherwise be represented using numeric values, alphanumeric values, or other formats. As such, the clients 160 in the Region 1 may each be responsible for a subset of such keys. By way of example, a first of the clients 160 may be responsible for aaaaa through bbbbb. A second of the clients 160 may be responsible for bbbbc-eeeee. A third of the clients 160 may be responsible for eeeef-fffff.

Assignment of shards may include balancing the assignment by assigning each instance an approximately equal number of shards, respecting region affinity. For example, if a given region has 10 shards and 3 clients, two clients may each be assigned 3 shards and the third client may be assigned 4 shards.

A routing table within each region may indicate which key range each client is assigned. As the key ranges define a shard, the routing table therefore maps shards to the clients in each region. The routing table may be stored, for example, at each client or pod, or at any one or more resources in communication with the other resources. In this regard, each pod knows which shards are assigned to which clients. As such, when an inbound request is received for a key in a shard, the pod knows which client owns the shard and will handle it.

At times, resharding may be appropriate, such as if the shard assignment becomes unbalanced. For example, the shard assignment may become unbalanced if clients are added or removed. Referring back to the example above with 3 clients and 10 shards, if a fourth client was added it would have zero shards, and therefore be unbalanced as compared to the other clients that were assigned 3 or 4 shards. Accordingly, the work distribution service may shift assignments to redistribute the shards. For example, two of the four clients may each be reassigned two shards, while the other two clients are assigned three shards. Such redistribution of shards may be performed by reassigning key ranges. The redistribution may be performed gradually over time, or at once.

According to some examples, the work distribution service may determine that resharding or redistribution of shards would improve traffic at the clients 160-180. For example, each pod may include a performance/failure monitoring mechanism that determines traffic metrics, such as a time for execution of tasks, a number of tasks waiting in a queue, a number of task failures, etc. The pod may report the traffic metrics to the work distribution service 100, or may generate a notification for the work distribution service that otherwise indicates performance or an action that the work distribution service should take. According to other examples, the work distribution service may itself include a monitoring mechanism that determines when resharding may be beneficial.

According to other examples, the workload for a service may increase over time, and the service may add more nodes to accommodate the workload. The work distribution service may redistribute shards among the increased number of nodes, and/or add shards. By way of example only, if a new service with 4 nodes uses the work distribution service with 20 shards, each node may be assigned 5 shards. If over time the service has a greater load, it may scale to 20 nodes. The work distribution service may redistribute the assigned shards, such that each node is now assigned one shard. Even later in time, the load for the service may increase further, and the service may scale to 30 nodes. At 30 nodes, the 20 shards originally assigned for the service may no longer be sufficient, as 10 nodes would be sitting idle. As such, the work distribution service may provide for increasing the number of shards, without downtime, to 30, 50, 100, or any other number of shards. The work distribution service may similarly reduce the number of shards if the workload and/or number of nodes later decreases.

According to some examples, the work distribution service 100 may redefine shards using different key ranges. For example, the work distribution service may assign a greater key range to a first client within a region while assigning a smaller key range to a second client within the region. The work distribution service 100 may update the routing table accordingly, and broadcast the updated routing table to the clients 160 in the Region 1.

By using key ranges to define shards, the key ranges may be split arbitrarily during resharding. Moreover, shard count may be auto-scaled. Further, hotspots may be naturally avoided where UUIDs are used for identifiers, because generation of such identifiers is random and spread out over the whole UUID space. Accordingly, when a client populates their database with UUID identifiers, no one single shard provided by the work distribution service will have a disproportionately high number of keys compared to other shards.

Figure 2:
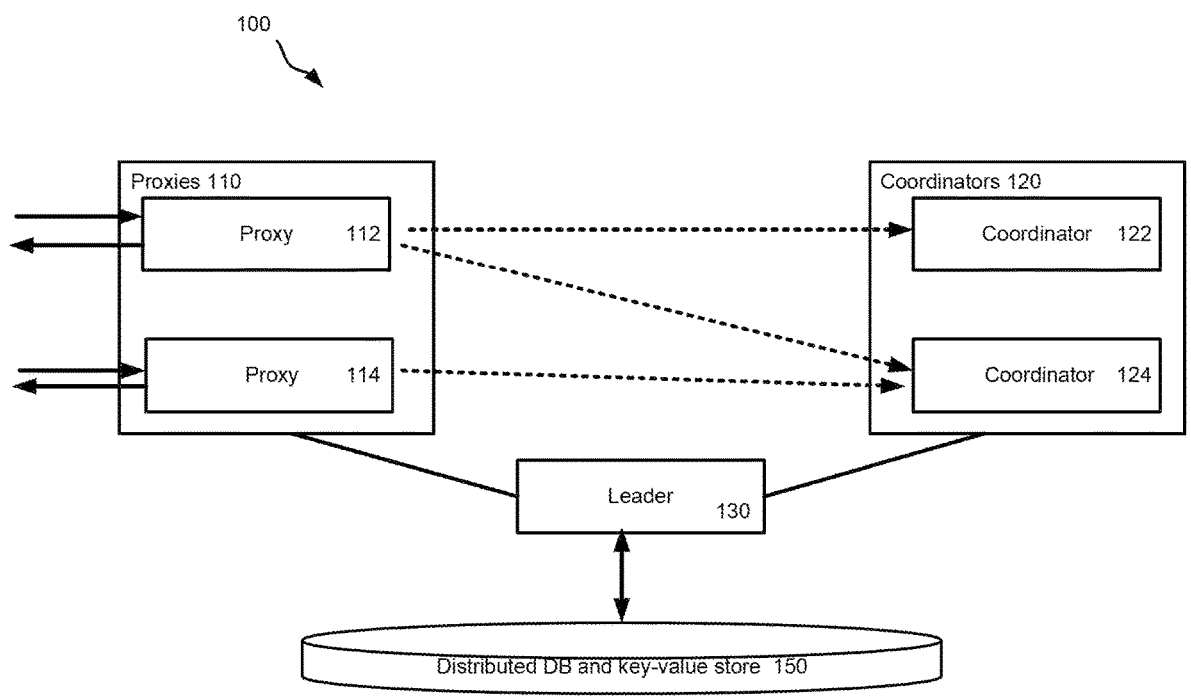
FIG. 2 is a block diagram illustrating an example multi-region deployment of the work distribution service according to aspects of the disclosure.

FIG. 2 illustrates an example architecture of the work distribution service 100. The work distribution service 100 may be executed in a distributed system of nodes, such nodes including one or more proxies 110 and one or more coordinators 120. For example, each node may be a server that runs the work distribution service, in which there are coordinator/leader/worker processes that run on the node. While a particular number of components are illustrated, the number of components may vary in implementation. A leader 130 may be elected from among the processes, the leader in communication with a distributed database 150. The work distribution service 100 may further include one or more workers (not shown). A bidirectional streaming API allows clients to connect to the work distribution service and to receive exclusive shard assignments.

The leader 130 may be responsible for domain assignments and load distribution among all coordinators 120. The leader 130 may further be responsible for publishing the domain assignment table to facilitate direct communication between nodes and coordinators. For example, the domain assignment table may publish information for establishing a multiplexed bi-directional streaming connection, such as using remote procedure calls (RPCs), gRPC, HTTP, etc. The information may include, for example, address, routing, or other connection information for a specific coordinator 120.

The leader 130 may be dynamically chosen from among a plurality of processes. For example, the leader 130 may be chosen based on availability, rotation, randomness, self-nomination confirmed by the nodes, or any other method of leader election. Coordinators 120 may heartbeat with the leader 130 to renew the leader's ownership lease. If a leader crashes, a new leader takes over and collects existing assignments from coordinators. If a coordinator 122, 124 crashes, the leader 130 will re-assign the coordinator after its lease expires.

Each coordinator 122, 124 is responsible for a single tenant. For the corresponding tenant, the coordinator may be responsible for sharding assignment with leasing and revocation, and load-balancing. Shards may be defined based on region, and may each include a range of addresses, such as UUIDs. Each domain participant, or consumer, may be connected to a specific coordinator that is responsible for its address via bidirectional streaming connection through a proxy. Domain participants heartbeat with the coordinator to maintain their lease. According to some examples, a domain participant may relinquish shards if it is to gracefully disconnect. Such sub-lease semantics may guarantee domain participant exclusivity.

The architecture may further include one or more workers (not shown). Each worker connects to the leader and manages a lifetime of one or more coordinators 120 as directed by the leader 130. The workers may update an assignment table used by the proxy for incoming client connections.

Each proxy 112, 114 may be responsible for forwarding messages from a recipient, such as a domain participant, to the coordinator that is responsible for that domain. Examples of such messages may include requests for assignments from a given domain, heartbeat messages, relinquish messages, etc. The proxy may maintain long-running connections between nodes. Examples of such long-running connections may include RPC streams or gRPC streams.

The distributed database 150 may be, for example, a geographically distributed structured query language (SQL) database. The distributed database 150 may include a key-value store.

While the example above illustrates a particular number of proxies, coordinators, and other components, it should be understood that this is merely one example. Other examples may include various numbers of each type of component. Moreover, the number of each component need not correspond to the number of any other component. By way of example, a system may include more proxies than coordinators, more coordinators than proxies, etc.

Figure 3:
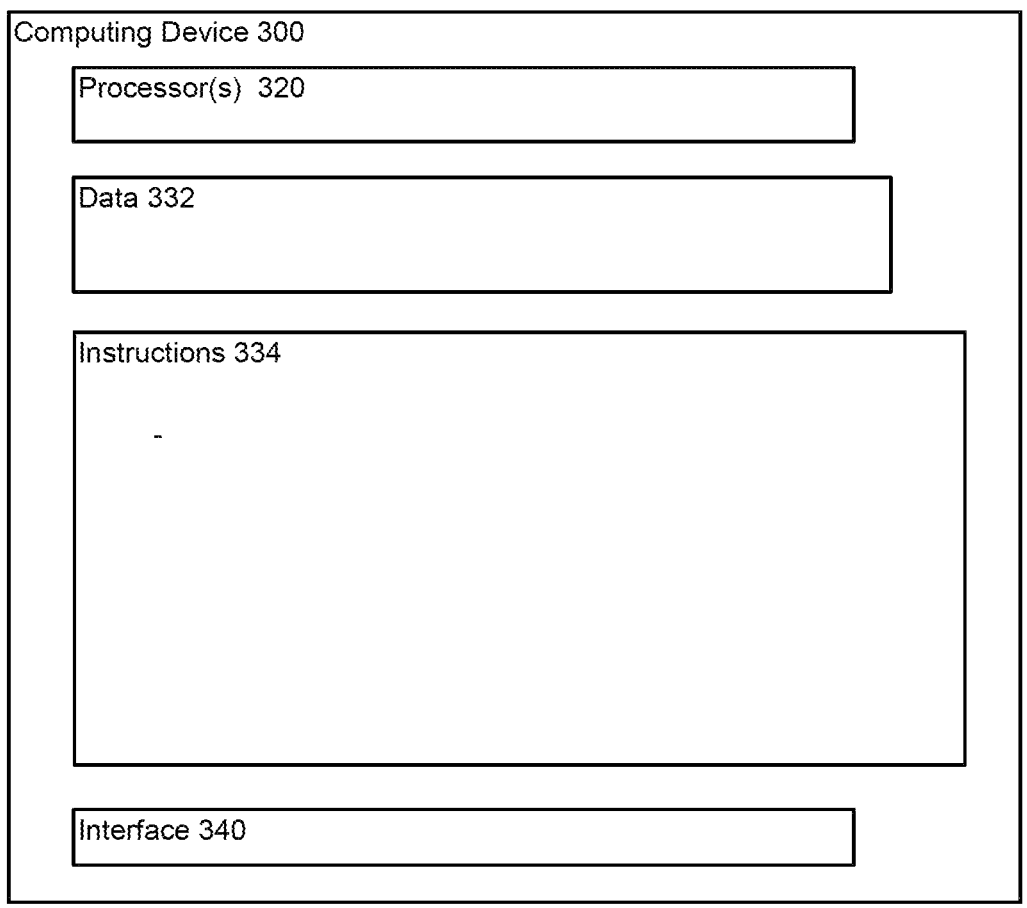
FIG. 3 is a block diagram illustrating an example computing device for the work distribution service according to aspects of the disclosure.

FIG. 3 illustrates an example computing device 300, which may be configured as a leader or coordinator in the work distribution service. The computing device 300 includes one or more processors 320, memory 330 and other components typically present in computing devices. Memory 330 can store information accessible by the one or more processors 320, including instructions 334 that can be executed by the one or more processors 320.

Memory 330 can also include data 332 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 334 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 332 may be retrieved, stored or modified by the one or more processors 320 in accordance with the instructions 334. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 320 can be any conventional processors, such as a commercially available CPU. Alternatively, the processors can be dedicated components such as an application specific integrated circuit ("ASIC") or other hardware-based processor. Although not necessary, one or more of computing devices 300 may include specialized hardware components to perform specific computing processes.

The computing device 300 may include a communication interface 340 enabling communication between the device 300 and other components, such as a distributed database, key-value store, consumer systems, etc. The computing device may communicate over a network and with other devices using various protocols and systems, such that the network can be part of the Internet, World Wide Web, specific intranets, wide area networks, or local networks. The network can utilize standard communications protocols, such as Ethernet, WiFi, HTTP, protocols described in IEEE 302.33, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

Although FIG. 3 functionally illustrates the processor, memory, and other elements as being within the same block, the processor, computer, computing device, or memory can actually comprise multiple processors, computers, computing devices, or memories that may or may not be stored within the same physical housing. Accordingly, references to a processor, computer, computing device, or memory will be understood to include references to a collection of processors, computers, computing devices, or memories that may or may not operate in parallel. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 334 and collectively form a medium for storing the instructions. Various operations described herein as being performed by a computing device may be performed by a virtual machine. By way of example, instructions 334 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Figure 4:
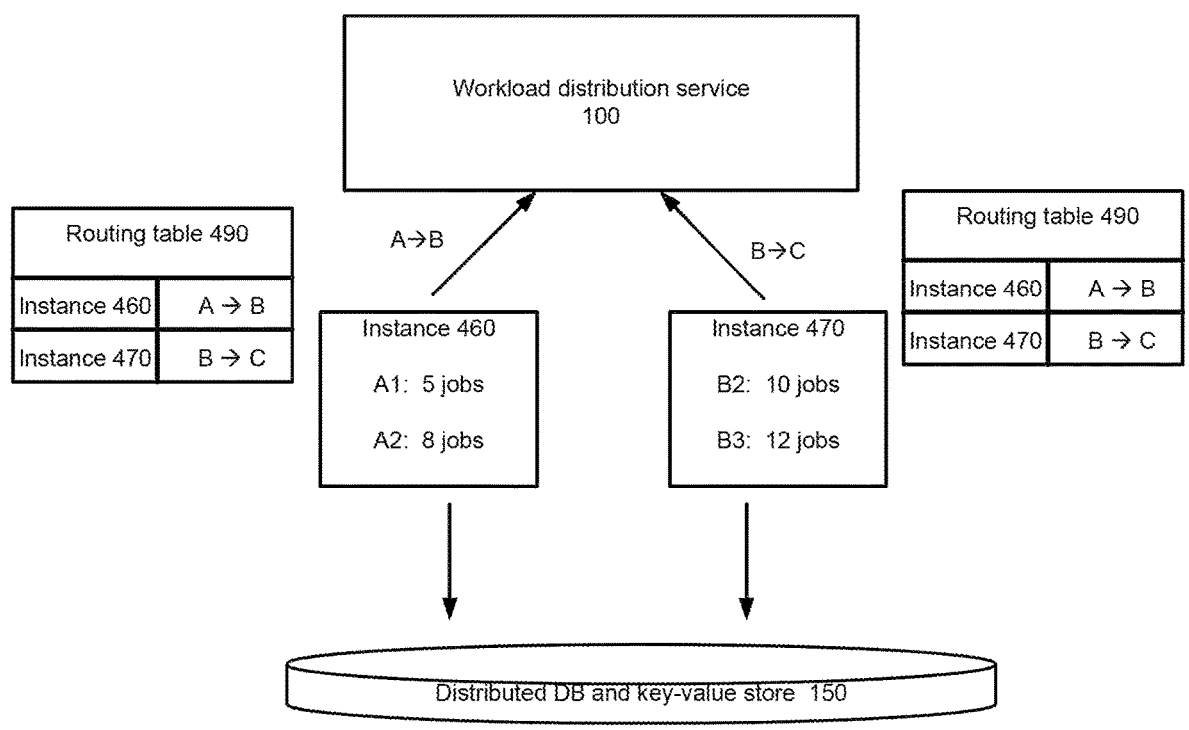
FIGS. 4-6 are block diagrams illustrating example operations of the work distribution service according to aspects of the disclosure.

FIG. 4 illustrates an example of the work distribution service 100 in operation. At startup, the work distribution service 100 may identify two instances 460, 470 for execution. For example, the work distribution service 100 may receive communications from the instances 460, 470. Such communications may include, for example, a request for shard assignment. According to some examples, the communication may be received at a proxy of the work distribution service 100 and forwarded to a coordinator based on the instance from which the communication received.

The work distribution service 100 may determine, based on the communications received from the instances 460, 470, shard assignments for the instances 460, 470. Initially, the shard assignments may be based on a number of the instances. For example, if there are two instances, the work distribution service 100 may divide the available shards evenly between the two instances. In other examples, the shard assignments may be based on respective workloads of the instances 460, 470. For example, a greater number of shards may be assigned to an instance having a greater workload as compared to an instance having a smaller workload.

Shard assignment may include assigning a range of keys or unique identifiers that correspond to resources in the distributed database 150. In this example, the entire range of identifiers, such as an entire UUID space, is abstracted into A-C. In the example shown, first instance 460 is assigned key range A-B, while second instance 470 is assigned key range B-C. Key range A-B may include, for example, resources A1, A2, A3, A4 . . . An. The key range B-C may include, for example, B1, B2, B3 . . . Bn. The resources may include, for example, computing devices, printers, etc.

The work distribution service 100 may publish a routing table 490 indicating the key range assignments for each instance 460, 470. According to some examples, each instance 460, 470 may store the routing table 490, such as in cache.

Once assigned, the instances 460, 470 may obtain the shards from the distributed database 150. For example, the first instance 460 may send a request or command for key range A-B and the second instance 470 may send a request or command for key range B-C. In the example of FIG. 4, in first instance 460, resource A1 has 5 jobs to execute and resource A2 has 8 jobs to execute. In second instance 470, resource B2 has 10 jobs to execute and B3 has 12 jobs to execute. It should be understood that these are merely examples for illustrative purposes.

Figure 5:
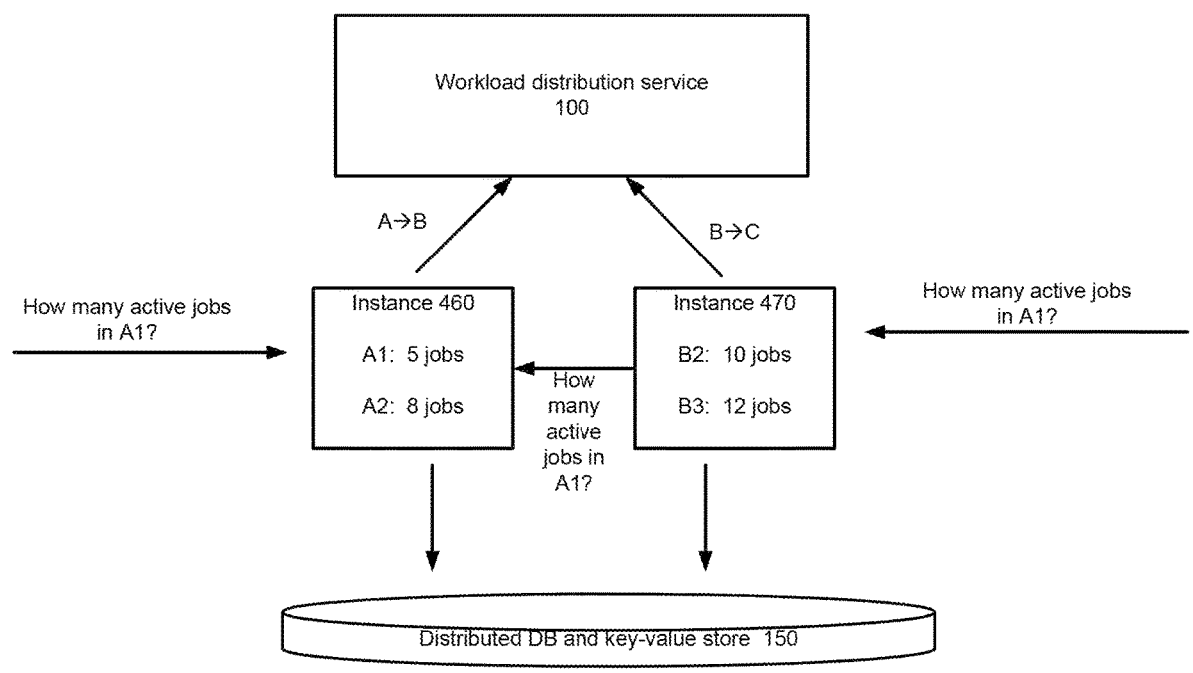

FIG. 5 illustrates an example of using the work distribution service to serve data in sharded form. In this illustration, different instances own different pieces of data and respond to requests for other services or users about the data. For example, any instance may receive a communication asking how many active jobs are running at a given resource. The request may originate from outside the work distribution service 100, such as from a different service seeking information about the resources. If the given resource is assigned to the instance that receives the request, that instance may respond to the request. For example, if the first instance 460 receives a request asking how many active jobs are in resource A1, the first instance 460 may respond to the request indicating that 5 jobs are active in A1. If the given resource is assigned to an instance different from the instance that receives the request, the instance that receives the request may forward it. For example, it the second instance 470 receives the request asking how many jobs are executing in resource A1, the second instance 470 may forward the request to the first instance 460 to which the resource A1 is assigned.

At times the work distribution service may determine whether resharding should be performed. Such determination may be based on, for example, the number of jobs executing in each instance. According to other examples, it may be determined based on performance or failure of the resources. According to other examples, resharding may be performed when an instance is added or removed, such as to reallocate the full range of keys among the updated number of instances.

Figure 6:
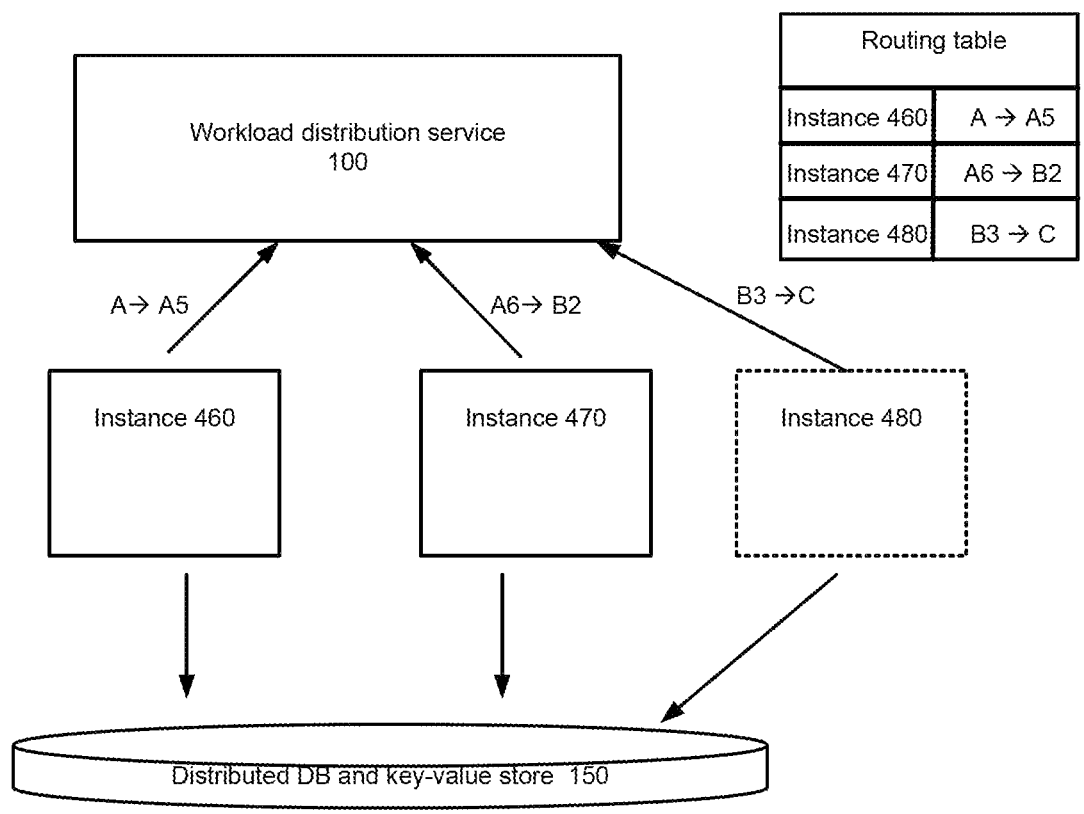

FIG. 6 illustrates an example of adding an instance. In this example, third instance 480 is added in the region including first instance 460 and second instance 470. Accordingly, the work distribution service 100 may determine to reshard. The work distribution service 100 may therefore redistribute the available keys among the first, second, and third instances 460-480. In the example shown, the work distribution service 100 allocates key range A-A5 for first instance 460, key range A6-B2 to second instance 470, and key range B3-C for the new third instance 480. The work distribution service 100 may update the routing table with the updated key ranges, and publish the updated routing table to the instances 460-480.

Figure 7:
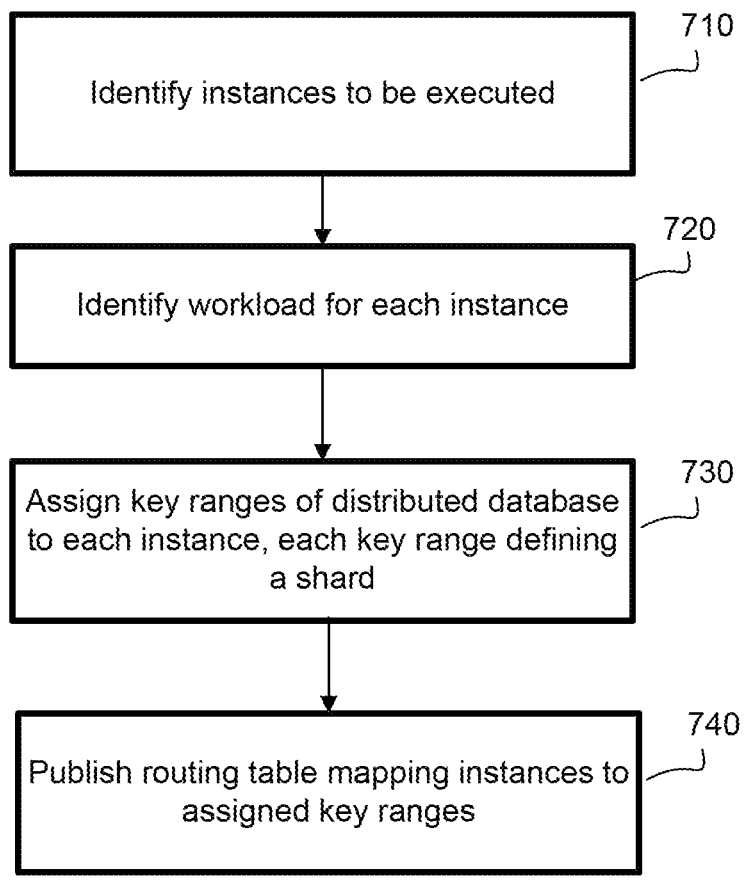
FIG. 7 is a flow diagram illustrating an example method of sharding according to aspects of the disclosure.
Figure 8:
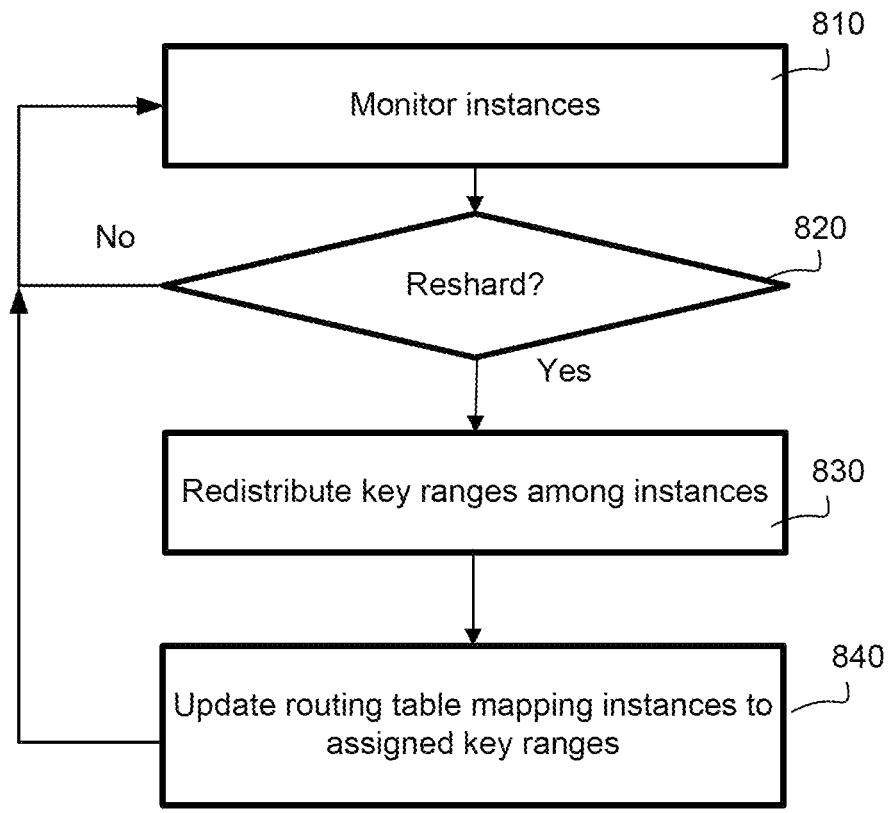
FIG. 8 is a flow diagram illustrating an example method of resharding according to aspects of the disclosure.

FIGS. 7-8 illustrate example methods including operations of the work distribution service. While the operations are described in a particular order, the order may be varied and/or operations may be performed simultaneously. Moreover, operations may be added or omitted.

FIG. 7 illustrates a method 700 of assigning shards to instances. In block 710, the work distribution service receives domain registrations from consumers and sends assignments to the consumers. For example, an application connects to a tenant as a consumer and may register for one or more domains. Each application may be run in an instance. Each instance may be executed in one of multiple regions.

In block 720, the work distribution service identifies a workload for each instance. Initially, this may be an estimate based on, for example, a type of application, a number of instances executing in each region, or other information related to the instances. In other examples, it may be initially assumed that all instances will have an approximately equal workload. In other examples, the work distribution service may determine a number of requests or active jobs for each instance.

In block 730, the work distribution service assigns key ranges, compatible with efficient operations of a distributed database and key value store, to each instance, each key range defining a shard. The key ranges may be a range of identifiers, such as UUID, corresponding to resources of the distributed database. The key ranges may be assigned based on the identified workload for each instance. For example, regions or instances having a greater workload may be assigned a larger key range as compared to other regions or instances having a lesser workload.

In block 740, the work distribution service generates a routing table mapping the instances to the assigned key ranges. The routing table may be published to each instance. Based on the routing table, each instance may identify owners of the assigned key ranges.

FIG. 8 illustrates a method 800 of resharding, which may be performed periodically as the work distribution service operates and instances are executed in a multi-region environment.

In block 810, the work distribution service monitors the instances executing in each region. For example, the work distribution service may employ a performance and/or failure monitoring mechanism. As another example, the work distribution service may track activity levels of each instance, such as by measuring the messages received from each instance. As a further example, the work distribution service may periodically poll the instances for workload information. For example, the work distribution service may ask each instance how many active jobs they are servicing. Such polling may be performed every minute, every hour, every day, every week, or at any other frequency. Monitoring may also include determining whether instances are being added or removed. For example, the work distribution service may receive a request from a new instance for an allocation of shards.

In block 820, it is determined whether to reshard, such as by breaking up the entire space of keys or identifiers (e.g., the entire UUID space) into a different number of shards. The determination may be based on the monitoring. For example, if a new instance is being added or if an instance is being removed, it may be determined to reshard. As another example, if a given workload is overloaded or failing, or if it is underutilizing resources, it may be determined to reshard. If it is determined not to reshard, the method 800 may continue monitoring the instances.

If it is determined to reshard, the work distribution service may redistribute the key ranges among the instances in block 830 to effect the resharding. The redistribution may change the key ranges assigned in one region in which workload or performance issues are detected or in which an instance is added or removed. In other examples, the redistribution may change the key ranges assigned across multiple regions. By reassigning the key ranges, the work distribution service reallocates the resources assigned to each instance.

In block 840, the mapping table is updated based on the resharding. The updated mapping table reflects the updated allocation of key ranges to instances. The updated mapping table may be published to each instance.

The work distribution service described herein may be implemented for any of a variety of applications. By way of example only, it may be used for a cloud printing application that uses sharding for printer monitoring. For example, the work distribution service may be used to dynamically assign ownership of poll-based printers to discoverable nodes, and protocol heads can forward requests. All printer protocols can then be implemented as long-running connection protocols with in-memory state.

Another example implementation is a queued messaging service, where sharding can be used to distribute queues, with region/key pairs, between workers within the service so that no single worker needs to handle all the queues at once. The work distribution service may be used to maintain and propagate a table of shard ownership for coordination between its working, allowing for simple and efficient communication.

Another example implementation includes a keyed event queue, where sharding is used to distribute queues among workers in the service for monitoring queues and messages for expiration.

While a few example implementations are described, the work distribution service may be implemented in a countless variety of applications.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of distribution of workload among a plurality of instances, comprising:
   receiving, with one or more processors, one or more domain registrations from one or more consumers, each of the one or more domain registrations for executing an application in one of a plurality of instances within a region;
   assigning, with the one or more processors, key ranges associated with a distributed database to each instance, each key range defining a shard;
   generating, with the one or more processors, a routing table mapping each instance with the assigned key ranges; and
   publishing the routing table to the plurality of instances.

2. The method of claim 1, wherein each instance is executed in one region of a multi-region computing environment.

3. The method of claim 2, wherein assigning the key ranges comprises distributing an entire set of available keys associated with the distributed database to the instances in each region.

4. The method of claim 1, further comprising identifying a workload for each of the plurality of instances.

5. The method of claim 4, wherein identifying the workload comprises polling the plurality of instances for a number of active jobs in each instance.

6. The method of claim 4, wherein identifying the workload comprises monitoring the plurality of instances for performance and/or failures.

7. The method of claim 1, further comprising:
   determining, by the one or more processors, whether to reshard;
   redistributing the key ranges of the distributed database among the plurality of instances when it is determined to reshard; and
   updating the routing table with an updated mapping of the plurality of instances and assigned key ranges.

8. The method of claim 7, wherein determining whether to reshard is based on determining that an instance is being added or removed in one of the one or more regions.

9. The method of claim 7, wherein determining whether to reshard is based on a workload for one or more of the plurality of instances.

10. A system for distribution of workload among a plurality of instances, comprising:
    memory; and
    one or more processors configured to:
      receive one or more domain registrations from one or more consumers, each of the one or more domain registrations for executing an application in one of a plurality of instances within a region;
      assign key ranges associated with a distributed database to each of the plurality of instances, each key range defining a shard;
      generate a routing table mapping each of the plurality of instances with the assigned key ranges; and
      publish the routing table to the plurality of instances.

11. The system of claim 10, wherein the one or more processors comprise:
    a plurality of computing nodes including a leader and one or more coordinators.

12. The system of claim 11, further comprising one or more proxies configured to route communications between the plurality of instances and the one or more coordinators.

13. The system of claim 10, wherein each of the plurality of instances is executed in one region of a multi-region computing environment.

14. The system of claim 13, wherein assigning the key ranges comprises distributing an entire set of available keys associated with the distributed database to the plurality of instances in each region.

15. The system of claim 10, wherein the one or more processors are further configured to identify a workload for each of the plurality of instances, identifying the workload comprising polling the plurality of instances or monitoring the plurality of instances.

16. The system of claim 10, wherein the one or more processors are further configured to:
    determine whether to reshard;
    redistribute the keys of the distributed database among the plurality of instances when it is determined to reshard; and
    update the routing table with an updated mapping of the plurality of instances and assigned key ranges.

17. The system of claim 16, wherein determining whether to reshard is based on determining that an instance is being added or removed in one of the one or more regions.

18. The system of claim 16, wherein determining whether to reshard is based on a workload for one or more of the plurality of instances.

19. A non-transitory computer-readable storage medium storing instructions executable by one or more processors for performing a method of distribution of workload among a plurality of instances, comprising:
- receiving one or more domain registrations from one or more consumers, each of the one or more domain registrations for executing an application in one of a plurality of instances within a region;
- assigning key ranges associated with a distributed database to each of the plurality of instances, each key range defining a shard;
- generating a routing table mapping each of the plurality of instances with the assigned key ranges; and
- publishing the routing table to the plurality of instances.

20. The non-transitory computer-readable storage medium of claim 19, wherein the method further comprises:
- determining whether to reshard;
- redistributing the key ranges of the distributed database among the plurality of instances when it is determined to reshard; and
- updating the routing table with an updated mapping of the plurality of instances and assigned key ranges.

* * * * *